Oct. 7, 1969 R. A. BOWKER 3,470,648
TROLLING DEVICE
Filed March 4, 1968

Inventor
Rockton A. Bowker
By George H. Simmons
Atty.

United States Patent Office 3,470,648
Patented Oct. 7, 1969

3,470,648
TROLLING DEVICE
Rockton A. Bowker, 2817 E. 76th Place,
Chicago, Ill. 60649
Filed Mar. 4, 1968, Ser. No. 709,991
Int. Cl. A01k 97/10
U.S. Cl. 43—21.2                                      8 Claims

ABSTRACT OF THE DISCLOSURE

A trolling device for mounting in the socket of the perch portion of a standard oarlock and secured therein by a retaining block which limits rotation of the device around the axis of the socket. The device has a saddle shaped to embrace the tapered end of a fishing rod handle, and a mounting base having a horizontal portion with a vertical portion depending from the inboard end thereof. A shank also depends from the horizontal portion to permit a rotating fit of the device in the oarlock perch. A resilient means extends between the finger hold means of the rod and the retaining block for releasably securing the rod handle in the saddle.

CROSS REFERENCES

The present invention is an improvement of the trolling device shown in my prior U.S. Patent 2,992,505 issued July 18, 1961, adapted to receive a modified form of the fish rod handle shown in my prior U.S. Patent 3,309,809 issued Mar. 21, 1967.

FIELD OF THE INVENTION

Trolling devices adapted to hold a fish rod on a boat in proper trolling position are preferably easily removed from the boat when not in use for trolling and are compact enough to be carried in a tackle box when not in use. When the line snags or a fish strikes the bait, the rod must be readily removable from the device to permit the manipulation required to clear the snag or to manually control the fish.

As used herein an oarlock consists of a perch mounted upon the side wall of a boat and containing a socket into which the shank of a portion attached to an oar is fitted to hold the oar on the boat in position proper for rowing.

PRIOR ART

My prior trolling device patent includes a channel shaped mounting base engaging the top and bottom surfaces of a special socket that is attached to the boat and is pivotally secured thereon by a pin that is attached to the base by a chain. The base, in one embodiment includes a socket in which a particularly shaped portion of the fish rod handle is engaged and has a groove in which the reel supporting section of the rod handle is engaged. In another embodiment the base carries an upstanding pin that projects into a perforation or a socket in the fish rod handle which is also registered in the groove in the base to prevent rotation of the handle around said pin. In both of these embodiments the web of the base strikes the gunnel of the boat to limit rotation of the device around the pin that secures the device upon the socket. When the boat is owned by the owner of the trolling device the socket can be permanently attached to the boat, but when attached to a rented boat a clamping device must be used.

SUMMARY OF THE INVENTION

The present invention has for its principal object the provision of a new and improved trolling device adapted to be mounted in and supported by a standard oarlock perch and arranged to support a fish rod handle in proper position for trolling.

In its preferred form, the trolling device consists of a saddle, shaped to embrace and hold the tapered rod receiving end of a fish rod handle, which saddle is mounted on an oarlock perch by a shank that is secured in the perch socket by a retaining block that fits over the shank and is restrained from rotation thereon and adapted to engage the oarlock perch to limit rotation of the saddle. A resilient cord fixed to the block and saddle mounting plate holds the block in place, and also this resilient cord extends from the mounting plate as a loop adapted to encircle the finger hold on the fish rod handle and is tensioned to hold the handle in the saddle with a boss on the handle registered in a notch in the saddle to prevent rotation of the handle in the saddle. When the line snags or a fish strikes the bait, the fish rod and handle are pulled against the tension of the cord out of engagement with the saddle.

The invention will be understood best from the detailed description and claims which follow reference being had to the accompanying drawings in which a preferred embodiment of the invention is shown by way of example and in which:

Figure 1:
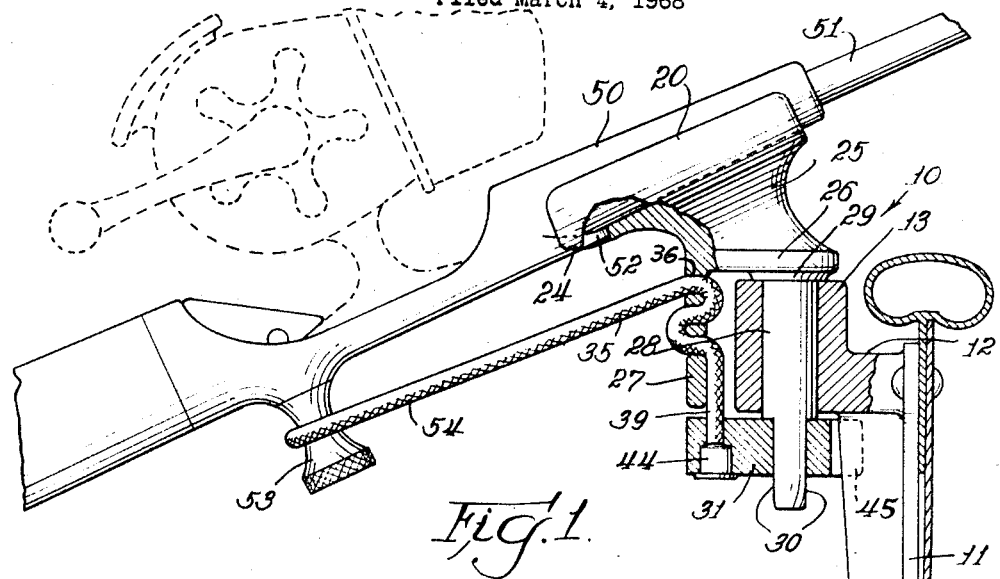
FIGURE 1 is an elevational view, partly in cross section, of the trolling device of the invention mounted in a standard oarlock perch and having a fish rod handle supported in it.

Referring now to the drawings in more detail from FIGURE 1 it will be seen that the oarlock perch indicated generally at 10 consists of a mounting plate 11 fixed upon the sidewall of the boat by suitable means such as rivets. Projecting inwardly from the mounting plate 11 is a boss 12 which contains at its distal end a socket 13. A reinforcing web 14 extends downwardly from the boss 12 and to the mounting plate 11 which web is integral with both of these members. The perch so described is a standard fixture with which most boats are equipped, which perches are usually die castings of aluminum or an aluminum alloy.

As will be seen in the drawings, the trolling device of the present invention consists of a saddle 20 which is generally cylindrical in shape but tapers from a larger diameter inboard end 21 to a smaller diameter outboard end 22. A tapered slot 23 extends from end to end of the saddle in the upper surface thereof. A notch 24 shown to be in the shape of a modified V, is located in the lower wall of the saddle at the inboard end thereof.

Depending from and integral with the saddle 20 is a mounting stool 25 which merges into a mounting plate that has a horizontal portion 26 from which a vertical portion or apron 27 depends from the inboard end of the portion 26. Depending from the portion 26 is a cylindrical shank 28 having a vertically tapered fillet 29 at the junction of the shank and plate. The shank is dimensioned for rotating fit in the socket 13 of the perch and extends completely through that socket. When the shank is so positioned in the socket the fillet 29 positions the trolling device vertically and centrally with respect to the oarlock perch.

Figures 2, 3, 4, 5:
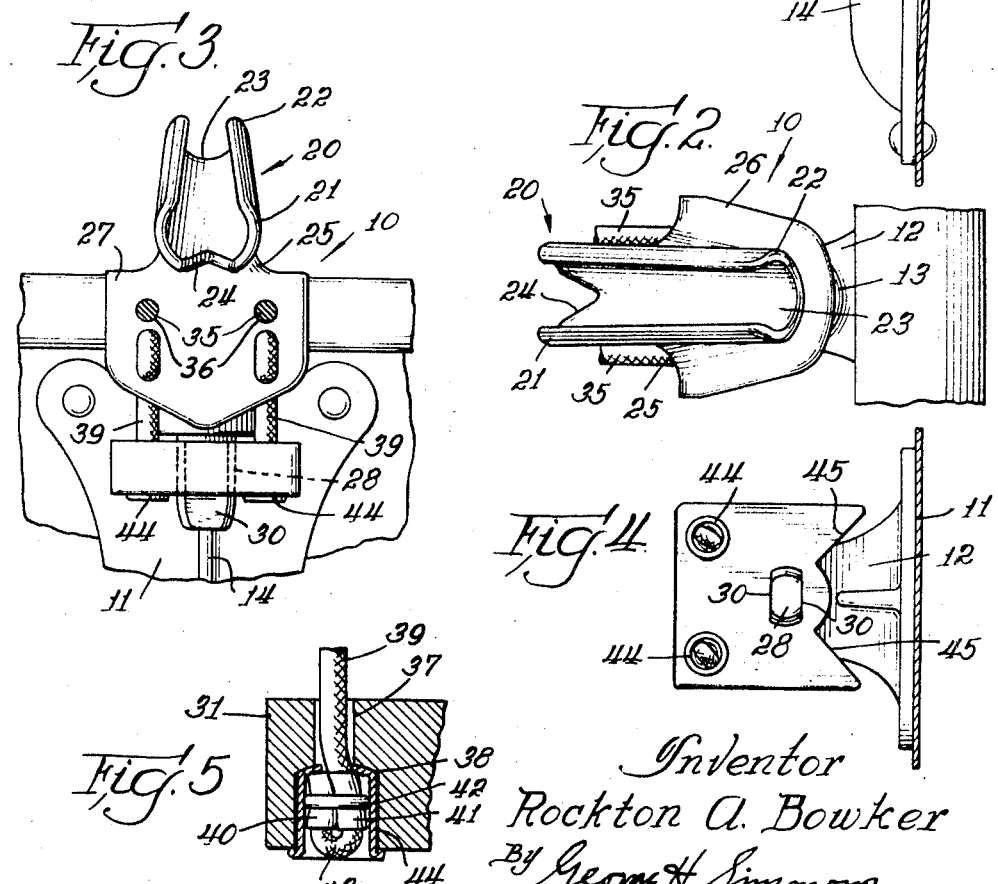
FIGURE 2 is a topside plan view of the device.
FIGURE 3 is an inboard elevational view of the device shown in FIGURE 1.
FIGURE 4 is a bottom view showing the retaining block.
FIGURE 5 is a fragmentary view partly in cross section showing the attachment of the resilient cord to the retaining block.

As shown in FIGURES 1 and 4 the portion of the shank depending below the socket contains spaced apart flat faces 30 which project through a mounting block 31 and are engaged by corresponding flat faces in the mounting block to hold that block against rotation around the axis of the shank. The use of other arrangements for preventing rotation of block 31 on shank 28 is contemplated within the teachings of the invention.

To hold the mounting block 31 upon the shank 28 there is provided a fabric covered resilient cord 35 readily available in marine supply stores. As shown this cord 35 is in one piece and has both of its ends threaded through upper perforations 36 thence downwardly and outwardly through middle perforations in the apron 27 thence downwardly and inwardly through lower perforations in this apron and thence downwardly along the inner surface of the apron 27 and through spaced apart perforations 37 in the mounting block 31. A counterbore 38 in each of the perforations 37 opens into the lower face of the block 31.

Preferably the ends 39 of the cord are fastened to the mounting block 31 in the manner best seen in FIGURE 5. It will be noted that a band of tape 40 encircles the end of the cord, to prevent unraveling of the fabric in which the resilient cord is encased, and a second band of tape 41 is spaced from the band 40 and the cord is folded over upon itself to register the two bands of tape together in which position they are secured by a metal ring 42. The folded over end 43 is then pressed into a ferrule 44 which fits snugly in the counterbore 38 in the block 31. Other fastening means such as knots may be used in lieu of the arrangement shown by way of example.

With the cord thus secured to the block 31 and with that block in the position shown in FIGURE 1, the slack in ends 39 of the cord is taken up by backing the same through the holes in the apron 27 sufficiently to tension the end portion 39 so as to hold the block securely on the shank 28 and abutted against the shoulders formed at the junction of the cylindrical and flat faces on the shank. The trolling device is thus secured in the socket 13 of the oarlock perch and is capable of rotation around the axis of that socket.

By threading the single cord 35 back and forth through the holes in the apron 27, the cord is capable of functioning as two cords due to the snubbing action of the arrangement. When the section 39 of the cord is stretched to permit placing the block 31 on the shank 28, the loop end 54 is not affected. When the loop is stretched to permit inserting the rod 51 and handle end 50 in the saddle 20, the end 39 is not affected.

To limit the amount of rotation around the axis of the socket 13, block 31 is provided with edges 45 which diverge from the axis of the shank 28 and are positioned to strike against the web 14 of the oarlock perch. Preferably the edges 45 are inclined sufficiently to permit rotation of the trolling device through about 45° on either side of a central position in which the saddle is disposed at right angles to the mounting plate 11.

As will be seen best in FIGURE 1 the fish rod handle that the trolling device is adapted to receive contains a tapered rod receiving end 50 of dimension capable of being snugly held in the saddle 20 to which end 50 the rod 51 is attached, preferably permanently. Depending from the bottom of the rod handle and at the junction of the section 50 and the reel receiving portion of that handle is a shoulder 52 shaped to register with the notch 24 to hold the rod handle against rotation in the saddle. The rod contains a finger hold 53 of the type shown in my above mentioned fish rod handle patent.

When it is desired to register the fish rod with the trolling device the finger hold 53 is engaged in the loop end 54 of the resilient cord 35 and the fish rod handle pulled inwardly of the boat against the tension of cord 35 until the smaller diameter outer end of the section 50 of the rod can be inserted in the larger diameter inboard end 21 of the saddle. The rod 51 is then moved into the saddle 20 through the slot 23 and the pull on the handle lessened to permit the tension in the cord 35 to pull the rod handle outwardly of the boat until stopped by engagement of the tapered portion 50 with the walls of the tapered saddle 20. The shoulder 52 will then be engaged with the notch 24 and rotation of the handle around its axis is thus prevented. The length of the loop 54 is such that when the fish rod handle is thus secured in the saddle the loop is under tension sufficient to hold the rod handle in this position.

When the line snags or a fish strikes the bait, it is necessary to remove the fish rod from the trolling device to permit the manipulation necessary to clear the snag or control the fish. This is accomplished by pulling the fish rod handle against the tension of loop 54 until the end 50 clears the saddle 20 and then raising the handle and rod out of that saddle. The finger hold 53 is then disengaged from the loop 54 to permit the required manipulation of the rod.

As shown, the trolling device preferably consists of a unitary die cast structure composed of aluminum or an aluminum alloy. The use of other materials and other forms of manufacture are contemplated within the teachings of the invention. As shown, the shank of the trolling device has opposed flat faces with which corresponding faces in the mounting block are registered to prevent rotation of the block around the axis of the shank. Other arrangements for preventing this rotation are contemplated. Preferably the block 31 is composed of a synthetic resin such as plexiglass but other materials may be used.

From the foregoing it will be apparent that the trolling device of the present invention contains many advantages. Since it is mounted in the socket of an oarlock perch, it may be used on rented boats as well as privately owned boats. The device is compact and when removed from the oarlock perch can be stored in the tackle box in a convenient manner.

While I have chosen to show my invention by illustrating and describing a preferred embodiment of it, I have done so by way of example only as there are many modifications and adaptations which can be made by one skilled in the art within the teachings of the invention.

What is claimed is:

1. A trolling device adapted to be mounted in the socket of an oarlock perch that has a mounting plate fixed upon a wall of a boat and a web extending from the socket to the mounting plate, said device being adapted to hold, in proper trolling position, a fish rod handle including finger hold means that has a tapered rod receiving end and has a V shaped shoulder depending from its lower side, said trolling device comprising:

(1) a saddle shaped to embrace the tapered end of a fish rod handle;
   (2) means for mounting said saddle in said oarlock perch;
   (3) means for securing the saddle mounting means in the socket of the oarlock perch, said means including a mounting base having a horizontal portion and a vertical portion depending from the inboard end a vertical portion depending from the inboard end of the horizontal portion and a shank, depending from the horizontal portion, dimensioned for rotating fit in the socket of the oarlock perch, and containing a fillet adjacent the horizontal portion that engages the oarlock socket to position the device vertically and centrally with respect to the perch;
   (4) and resilient means releasably engaging said finger hold means for releasably securing the fish rod handle in said saddle.

2. A trolling device as specified in claim 1 in which the saddle is substantially cylindrical in shape and tapers from a larger diameter at its inboard end to a smaller diameter at its outboard end.

3. A trolling device as specified in claim 2 in which there is an upwardly opening tapered slot in the saddle through which a fish rod may pass as the fish rod handle is being registered with the saddle.

4. A trolling device as specified in claim 2 in which there is a modified V shaped notch in the bottom of the saddle opening into the inboard end thereof and adapted to receive the V shaped shoulder on the fish rod handle to prevent rotation of the handle in the saddle.

5. A trolling device as specified in claim 1 in which the means for securing the device in the socket of the oarlock perch includes a retaining block fitted over the distal end of the shank and containing at least one flat surface in engagement with a flat surface on the shank to prevent rotation of the block around the axis of the shank.

6. A trolling device as specified in claim 5 in which said resilient means comprises a resilient member fixed to and extending between the block and the vertical portion of the mounting base is tensioned to hold the block upon the shank.

7. A trolling device as specified in claim 6 in which the block contains opposed edges in its outboard end diverging from the axis of the shank and adapted to engage the web of the oarlock perch to limit rotation of the trolling device around the axis of the socket.

8. A trolling device as specified in claim 1 in which the means for releasably securing the fish rod handle in the saddle includes a resilient member attached to the saddle mounting means, adapted to encircle the finger hold on the handle and tensioned to hold the rod receiving end of the handle in the saddle.

References Cited

UNITED STATES PATENTS

| | | | |
|---|---|---|---|
| 919,981 | 4/1909 | Unger | 248—40 |
| 2,465,565 | 3/1949 | Agner | 248—42 |
| 2,523,356 | 9/1950 | Cherry | 43—21.2 |
| 2,912,196 | 11/1959 | Johnson | 248—42 |
| 2,992,505 | 7/1961 | Bowker | 43—21.2 |
| 3,246,865 | 4/1966 | Latimer | 43—21.2 X |

ALDRICH F. MEDBERY, Primary Examiner

J. H. CZERWONKY, Assistant Examiner

U.S. Cl. X.R.

248—42